2,982,301
CONSTANT RUNOUT CONTROL VALVE IN A HYDRAULIC ARRESTING CONTROL

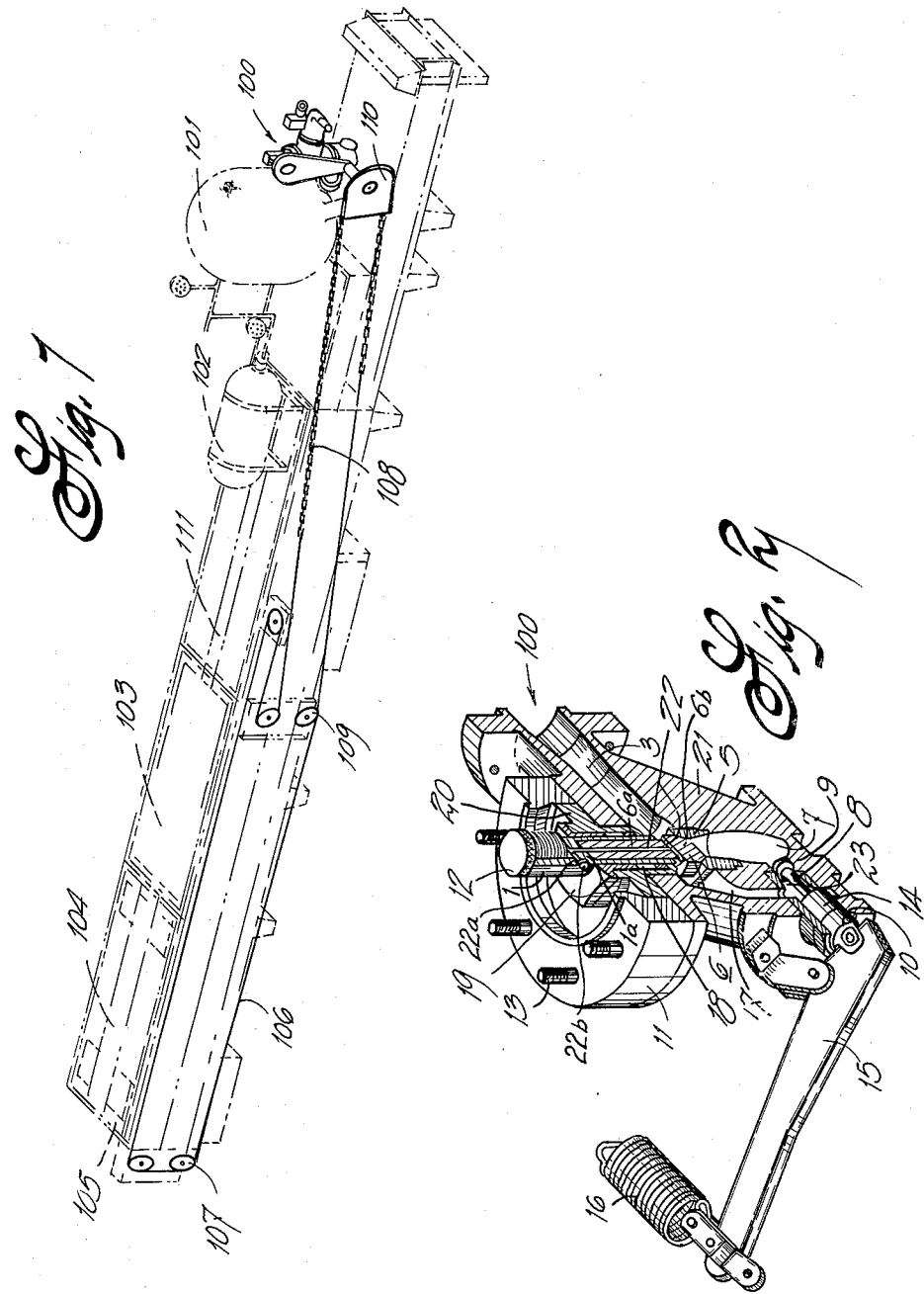

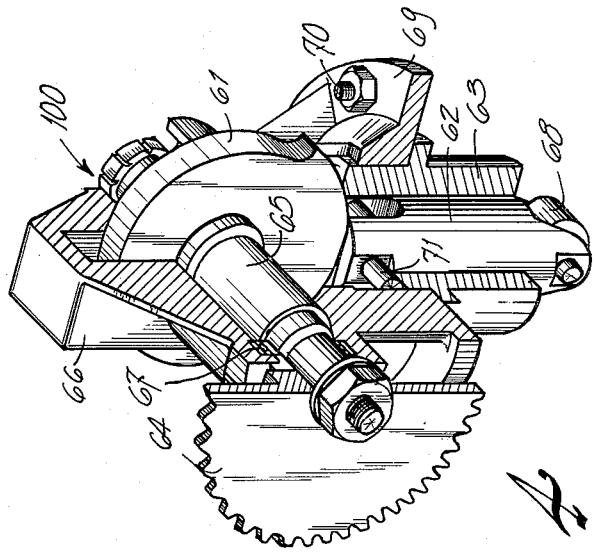
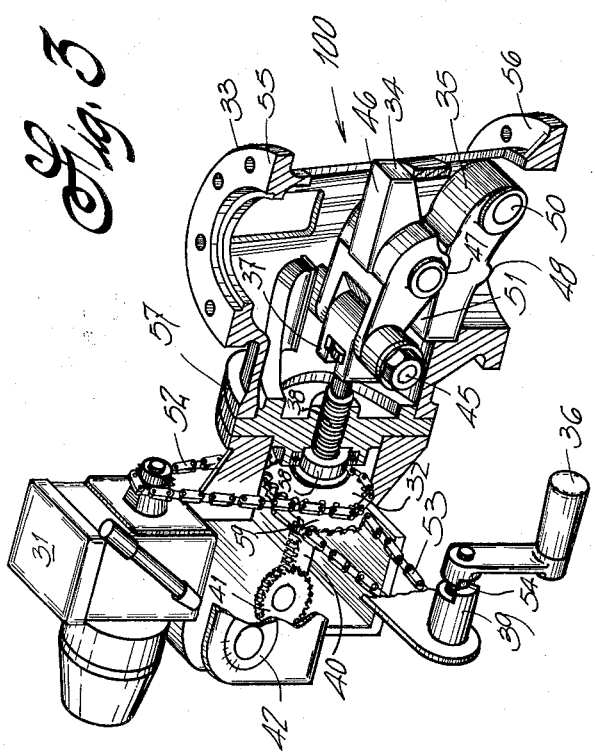

Robert W. Cruger, 70 Drexelbrook Drive, Drexel Hill, Pa.

Original application Mar. 29, 1957, Ser. No. 649,584. Divided and this application May 6, 1958, Ser. No. 733,452

3 Claims. (Cl. 137—495)

(Granted under Title 35, U.S. Code (1952), sec. 266)

The invention described herein may be manufactured and used by or for the Government of the United States of America for governmental purposes without the payment of any royalties thereon or therefor.

This application is a division of copending application Serial Number 649,584, filed March 29, 1957.

This invention relates to aircraft hydraulic arresting systems. The improvement resides in the arresting control valve in such systems.

The object of this invention is to provide a valve capable of stopping all airplanes at approximately the same spot.

A further object of this invention is a control valve capable of stopping all aircraft with constant runout.

A still further object of this invention is a control valve that has a longer service stroke than was safe with former valves seeing similar service.

A still further object of this invention is to provide control valve for aircraft arresting wherein the only setting required is the weight of the particular airplane being arrested.

These and other objects will be readily apparent to those familiar in the art with reference to the following description and attached drawings wherein:

Figure 1 is a diagrammatic sketch of the control system including the instant control valve, Figure 2 is an isometric view of the lower portion of the control valve and includes the valve unit itself, Figure 3 is an isometric view of the central portion of the control valve and includes the leverage mechanism, and Figure 4 is an isometric view of the upper portion of the control valve and includes the cam mechanism.

Referring to Figure 1, the conventional cross-head 104 of the aircraft arresting engine 103 mounted adjacent the airplane runway is connected to a cable drive 106 by a bracket 105. The cable 106 is strung around a series of pulleys 107, 109 and tensioned in the proper manner. A portion of the cable consists of a chain drive 108, which drives and rotates sprocket 110 adjacent the valve 100. The rotary motion at sprocket 110 provides the drive for rotation of the cam in the valve, described more fully herein. Accumulator 101 is connected to a source of air pressure 102 and its outlet is connected to the valve 100. A hydraulic line 111 connects the cylinder chamber of the hydraulic arresting engine with the appropriate connection in the valve.

Referring to Figure 2, the lower section of the arresting control valve comprises an upper annular spacer 11 and a lower housing member 21. Projecting upward from the spacer are a plurality of lugs 13 for engagement with the lower portion of the weight selector (Figure 3). Located in the recess portion of the spacer 11 is a two-stepped ring 20 having a central bore therein and the smaller diametered step of the ring extends through a complementary bore in housing 21. Slidably centered in the bore of the ring 20 is the valve sleeve 1 which extends at the upper end past the extremity of the ring 20. Valve sleeve 1 has a partition wall 1a therein intermediate the ends thereof which divides the valve sleeve into two sections or chambers (no reference numerals). Packing gland 19 and chevron packing 18 provide seal means between the valve sleeve 1 and ring 20. The valve sleeve 1 is made tubular at each end, with one of the ends being capped by a threaded cover 12; the opposite tubular end slidably receives the stem or stem portion 6a of the valve member 6 of the arresting control valve. The valve head 6b of the valve member 6 mates with the valve seat 5 to control the flow of fluid from the cylinder chamber 7 to the accumulator chamber 3 and passage 17. Chamber 7 is directly connected to arresting cylinder 103 via conduit 111 (Figure 1), while accumulator chamber 3 is directly connected to the accumulator 101 (also Figure 1). Drilled channels 22 extend transversely and longitudinally of the valve stem 6a and lead from the accumulator chamber 3 to the top of the valve stem. A similar transverse channel or passage 22a extending through the valve sleeve 1 connects the tubular sections of the sleeve 1. A threaded plug 22b is carried in transverse passage 22a adjacent the outer extremity thereof to prevent the leakage of fluid from the interior of the valve sleeve 1.

To one side of cylinder chamber 7 is located a side port 23 containing a retracting or retraction valve housing 9 and a slidable retracting or retraction valve 8 therein. The valve face complements the seat situated on the housing thus cutting off communication between the cylinder chamber 7 and the conduit or passage 17. The valve stem of the retracting valve 8 is joined to a cylindrical plunger having sections 10, 14, separated by a standard O ring seal. The face area of the plunger is greater than the face area of the valve face so that there is a constant tendency to maintain the face and seat of the reracting valve in the mated or closed position.

Connected to one end of the plunger and retracting valve is a manual lever 15 fulcrumed to the housing 21 and biased to a valve-closed position by a spring 16.

Referring to Figure 3, the airplane weight selector section of the valve consists of a T-shaped stanchion or housing 33 having flanges 55, 56 and 57 at each end of the T. The lower flange 56 mates with the spacer 11 portion of Figure 2 with bolts 13 entering complementary ports in such flange.

A fixed lever 35 is pivoted at 50 to the stanchion 33; on the underside of the lever a metal pad 48 bears against the screw section 12 of the sleeve 1 (Figure 2). The top of the lever has a flat bearing surface 51 for engagement with the second lever 34. The latter lever has a projecting contact surface 47 for engagement with the flat surface 51 of lever 35. On the topmost side of the lever 34, a flat surface 46 projects outward for engagement with the cam roller 68 to be described later (Figure 4).

The forward end of adjustable lever 34 is yoked with the yoke receiving block 37 and pivoted thereto as at 45 by conventional spacers, nuts etc. Lead screw 38 is secured to the block 37 and is supported by nut 58 set in ball bearings. A sprocket 32 is similarly threaded on screw 38 and has a chain 52 engaging the periphery of the sprocket wheel 32 imparting rotary motion from a motor unit 31. The latter unit is equipped with a conventional clutch to engage or disengage the motor unit from the drive system.

A second sprocket wheel 59 is threaded on screw 38 and has a chain drive 53 leading from a hand crank 36. A conventional clutch has jaws 39, 54 for positive engagement of the crank with the drive system.

Extending from the free end of the lead screw 38 is a rack 40 having its teeth rotating a plurality of change gears 41. The latter gears are connected to the local indicator 42, thereby giving a visual indication of the position of the leverage system 34, 35. For ease in setting, the indicator may be calibrated in pounds.

Referring to Figure 4, the cam and plunger assembly consists of a housing 66 having a lower flange 69 attached thereto. The latter flange mates with the flange 55 of the stanchion 33 and the two flanges are secured to each other by fastening means 70.

Mounted within the housing is a rotating cam 61 secured to shaft 65, the latter being housed in bearings 67 in the housing. Secured to one end of the shaft is a sprocket wheel 64 rotated by the chain 108 (Figure 1) actuated by the cross head mechanism. The cam 61 therefore rotates in a predetermined relation with the linear travel of the crosshead.

A plunger 62 is located between the cam 61 and the adjustable lever 34 (Figure 3); the cam plunger is guided in its travel by a plunger guide 63 secured to the underside of the housing 66. Rotatably mounted on one end of the plunger is a cam roller 68 which bears against the flat bearing surface 46 of lever 34 (Figure 3); lug 71 projecting from the side of plunger 62 cooperates with an end surface of guide 63 to act as a limit means for the downward travel of the plunger and roller means.

With relation to the lever system (Figure 3), the lever arm ratio of each lever is variable between 1:1 and 2:1. In the particular design used, the distances from the pivot point to the roller or pad and to the lever extremity of each were made equal; however, the distances may be altered to obtain different ratios for different design purposes. For a better understanding of the lever system, it should be thought of in terms of a distance divider rather than a force multiplier. Thus the system is variable from a ratio of 1:1 to 4:1. For example, if roller 68, roller 47 and pad 48 are in line, downward movement of the cam plunger and roller, say 1" will produce a downward movement of 1" at pad 48. At the other extreme, with a ratio of 4:1, movement of roller 68 of 1" will produce a movement at roller 47 of adjustable lever 34 of ½" and a corresponding movement at pad 48 of ¼".

*Operation*

In commencing the operation of an arrestment, the weight of the particular airplane to be arrested must be known. The weight of the airplane is set into the lever system either through (a) the hand crank 36, or (b) through motor unit 31 which can be remotely controlled if desired. In either case, rotation of either sprocket wheel 32 or 59 causes linear travel of the lever system via lead screw 38. At the same time gears 41, rack 40 are actuated thereby to denote on the local indicator 42 the weight set.

In making this adjustment, pressure fluid from the accumulator chamber 3, in addition to assisting in seating the head 6b of valve member 6, also enters ports 22 and separates sleeve 1 from valve stem 6a providing a cushion for the valve stem. Fluid also enters passage 17 creating a differential pressure on the retracting valve such that the retracting valve is maintained in its closed position. The hook-up of Figure 1 is now in "battery" ready for arrestment.

Referring to Figure 1, the airplane's landing hook (not shown) picks up the deck pendant (not shown) causing travel of crosshead 104 into the hydraulic arresting engine 103. Pressure fluid is displaced into line 111 and chamber 7 thereby opening arresting valve member 6 against the accumulator pressure on the reverse side of head 6b of the valve member. The rise of the valve stem 6a is cushioned by the fluid at accumulator pressure between the sleeve 1 and valve stem.

Upon further movement of the crosshead, cable 106 is rotated thereby actuating chain 108 which in turn rotates sprocket wheel 64 (Figure 4). Cam 61 is rotated by this sprocket wheel effecting a gradual closing of the valve member 6; the resistance of the valve member 6 to flow fluid from the cylinder chamber 7 to the accumulator chamber 3 is thereby gradually increased and the energy of the airplane is dissipated in forcing fluid through the restricted valve opening.

At the end of a predetermined cross head travel, the cam has rotated through its work cycle and has moved the head 6b of the valve member 6 into contact with the valve seat 5; the flow of fluid is cut off and the plane is brought to a positive stop.

To retract the arresting unit to "battery," lever 15 is actuated to open retracting valve 8. The fluid, at accumulator pressure increased by cylinder pressure during arrestment, forces the fluid in line 111 back into the arresting engine reversing the plunger (not shown) and crosshead 104. Cables 106 are simultaneously reversibly rotated thereby rotating the cam 61 to its original position with pressure fluid in the accumulator causing the sleeve 1 to maintain contact with the lever system and the latter system to maintain contact with roller 68. When the cross head 104 is fully retracted, the sleeve 1 and cam 61 have returned to their original positions; retracting valve 8 is closed and the arresting unit is at "battery."

It is noted that the arresting control valve is of the "constant runout" type. Thus, the initial positioning of the lever system determines the degree of opening of the valve member 6. Adjustment of the setting determines the position of the valve sleeve 1 which controls the degree of opening of the valve member 6. The degree of opening controls the rate of closure as the action of the cam 61 upon the sleeve 1 is always the same. A predetermined amount of crosshead travel corresponds to a predetermined degree of cam rotation so that the valve member 6 is closed always at the same point. Correspondingly, the airplane is always finally arrested at the same point.

In addition, upon the termination of an arresting stroke, the valve member 6 is in its seated position. The levers are so mounted and adjusted that a change in ratio does not affect the valve sleeve 1 when the valve member 6 is so seated. Because of this, the point of closing the valve member 6 is independent of the airplane weight selector. It is a function of the cam only, and therefore it is constant.

Obviously many modifications and variations of the present invention are possible in the light of the above teachings. It is therefore to be understood that within the scope of the appended claims the invention may be practiced otherwise than as specifically described.

What is claimed is:

1. A valve for restricting the flow of fluid from one pressurized fluid source to another pressurized fluid source comprising a casing having an inlet therein communicating with one pressurized fluid source and an outlet therein communicating with another pressurized fluid source, said casing inlet and outlet being intersected by a valve seat, means carried by said casing having a bore therein, a tubular sleeve slidably carried in said bore, said tubular sleeve having a partition wall therein intermediate the ends thereof dividing said tubular sleeve into two sections, said partition wall having a substantially axially extending passageway therein establishing communication between said sections in said tubular sleeve, cover means carried in one end of said tubular sleeve and defining a fluid chamber in one of said sections of said tubular sleeve between said partition wall and said cover means, a valve member including a stem slidably carried in the other of said sections of said tubular sleeve, said valve member having a head thereon with said head being movable between open and closed positions relative to said valve seat, said valve stem having a passageway therein registering with said passageway in said partition wall and communicating with said casing outlet to thereby establish communication between said fluid chamber in said tubular sleeve and the pressurized fluid in said casing outlet, lever means operatively connected to said cover means carried by said tubular sleeve for selectively varying the degree of slidable movement of said tubular sleeve in one direction to thereby selectively vary the lift of said valve member, and cam means engageable with said lever means for imparting movement to said lever means in one direction to thereby move said valve member to said closed position upon a predetermined angular movement of said cam means, said valve member normally being held in said closed position by the pressure of said fluid in said casing outlet acting thereon and said chamber in said one section of said tubular sleeve normally being filled with pressurized fluid at the pressure existing in said casing outlet, said valve member being movable to a predetermined open position when the pressure of the fluid in said casing inlet exceeds the pressure of the fluid in said casing outlet to thereby define a restricted passageway for the flow of fluid between said pressurized fluid sources.

2. A valve as claimed in claim 1 wherein said cover means takes the form of a threaded cap or plug carried in one end of said tubular sleeve.

3. A valve as claimed in claim 1 wherein said lever means operatively connected to said tubular sleeve is comprised of a first lever rotatable about a fixed axis and a second lever rotatable about an axis capable of tongitudinal adjustment relative to the fixed axis of said first lever, said first lever acting on said cover means carried by tubular sleeve at a predetermined distance from said fixed axis of rotation of said first lever and said second lever acting on said first lever at a predetermined distance from said fixed axis of rotation of said first lever, said cam means being engageable with said second lever at a predetermined distance from the axis of rotation of said second lever.

References Cited in the file of this patent

UNITED STATES PATENTS

| | | |
|---|---|---|
| 368,445 | Baldwin | Aug. 16, 1887 |
| 2,521,166 | Hinrichs | Sept. 5, 1950 |
| 2,587,421 | Willach | Feb. 26, 1952 |
| 2,605,107 | Glinn | July 29, 1952 |
| 2,641,438 | Arnold | June 9, 1953 |
| 2,731,219 | Cotton et al. | Jan. 11, 1956 |
| 2,777,653 | Cotton et al. | Jan. 15, 1957 |
| 2,830,618 | Mitchell | Apr. 15, 1958 |

FOREIGN PATENTS

| | | |
|---|---|---|
| 802,047 | France | of 1936 |